United States Patent [19]

DeFusco

[11] 4,298,154
[45] Nov. 3, 1981

[54] AUTOMATIC SOLDERING MACHINE

[75] Inventor: Douglas F. DeFusco, Warwick, R.I.

[73] Assignee: B. B. Greenberg Company, Providence, R.I.

[21] Appl. No.: 112,074

[22] Filed: Jan. 14, 1980

[51] Int. Cl.³ .............................................. B23K 37/04
[52] U.S. Cl. ................................ 228/49 R; 29/160.6; 228/47; 228/212; 269/40; 432/261
[58] Field of Search ................. 228/47, 49 R, 57, 123, 228/212, 218, 220; 29/160.6; 59/35; 269/40, 289 R; 432/253, 258, 261

[56] References Cited

U.S. PATENT DOCUMENTS

| 823,031 | 6/1906 | Buckley et al. | 269/40 |
| 2,301,915 | 11/1942 | Harrington | 228/220 X |
| 3,230,609 | 1/1966 | Kooi et al. | 228/123 X |
| 4,174,950 | 11/1979 | Jalbert | 432/261 X |

FOREIGN PATENT DOCUMENTS 297866  6/1932  Italy ..................................... 269/40

Primary Examiner—Gil Weidenfeld
Assistant Examiner—K. J. Ramsey
Attorney, Agent, or Firm—Salter & Michaelson

[57] ABSTRACT

An automatic apparatus for soldering jump rings conventionally used in chain jewelry. The apparatus includes a fixture in which at least one and preferably a plurality of laterally oriented grooves are disposed in the upper face of a heat resistant fixture which in turn is adapted to move longitudinally with respect to a frame which supports the fixture. In addition to the laterally oriented grooves, at least one and preferably a pair of longitudinally oriented grooves are disposed in the face of the fixture in intersecting relation to said lateral grooves. Heating means including means for directing a pinpoint flame jet to each of the longitudinal grooves is fixedly positioned on the frame such that when the jewelry chain is placed in the laterally extending grooves with the jump ring or rings disposed in the area of intersection between the longitudinal and the lateral grooves, relative movement of the fixture with respect to the frame causes the jump rings to be moved progressively past such pinpoint flame jets so as to heat the same and accordingly accomplish the desired soldering action.

8 Claims, 4 Drawing Figures

AUTOMATIC SOLDERING MACHINE

BACKGROUND AND SUMMARY OF THE INVENTION

This invention deals with a machine, device or apparatus for automatically soldering components of elongated jewelry articles such as a split jump ring utilized to connect chain to an ornament, a spring ring or other various components of such jewelry articles. More particularly the invention has applicability to the hard soldering of such jump ring components, that is, wherein a silver base or similar solder requires relatively high fusion temperatures to be utilized so as to form a particularly strong soldered joint. Such soldering is normally accomplished by hand wherein a skilled operator will clasp a jump ring with a pair of pliers or otherwise fix its position and thereafter apply a relatively wide, high temperature flame to the spaced joint to be connected and to which the solder paste has been previously applied. As indicated, such requires skilled operators and even then care must be particularly taken so that adjacent areas of the jewelry articles, such as a chain body, an ornament or spring ring thereof, will not be contacted by the flame for an undue length of time, to cause either annealing or discoloration thereof. In addition to the skill required for such procedures, hand operations have the inherent drawback of being of relatively slow speed and difficult to control.

It is therefore a primary objective of this invention to provide an automatic soldering apparatus for expediting the time rate for soldering together adjacent ends of a jump ring after a link of a jewelry chain or other article has been interengaged therewith.

A further object of the present invention is to provide an apparatus of this type in which the heat application is precisely controlled to ensure localized heating of the jump rings such that adjacent areas of the jewelry articles are subjected to minimal thermal contact.

A still further object of the present invention is the provision of an automatic soldering apparatus of the type set forth above in which a plurality of jewelry articles may be sequentially soldered while disposed in a common fixture.

These and other objects of the present invention are accomplished by the provision of an automatic soldering apparatus for soldering together the split ends of jump rings conventionally utilized in the manufacture of jewelry to connect chain to opposite sides of an ornament and to a spring ring, wherein it is desirable to avoid adversely thermally contacting those portions of the jewelry article adjacent the jump ring, comprising a frame including longitudinally directed, laterally spaced guides, a heat resistant fixture disposed between said guides, said fixture adapted for longitudinal movement relative to said frame and having a generally planar upper face in which at least one laterally extending article-receiving groove is disposed for receipt of said jewelry article in a fixed position relative to said fixture, at least one longitudinally oriented groove intersecting said lateral groove, said point of intersection adapted to receive one of said rings to be soldered, heating means mounted on said frame for directing a narrow high temperature flame jet into said longitudinal groove and means for longitudinally moving said fixture relative to said frame whereby said one ring is contacted by said flame jet.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention.

DESCRIPTION OF THE INVENTION

Figure 1:
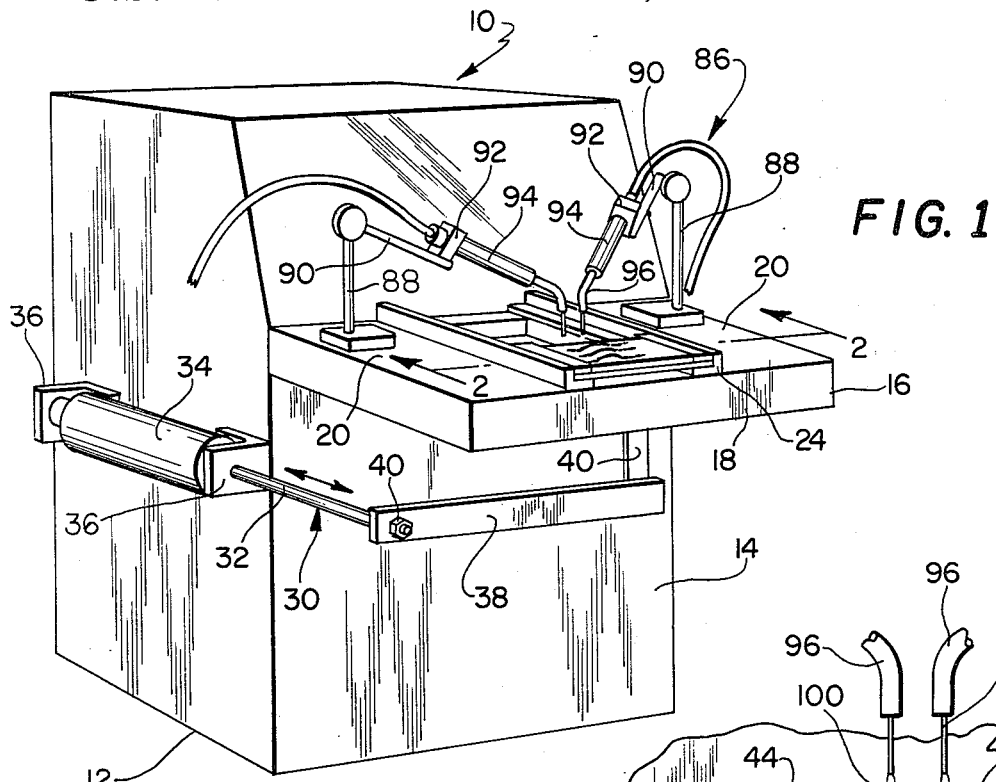
FIG. 1 is a perspective view of the apparatus of the present invention.
Figure 2:
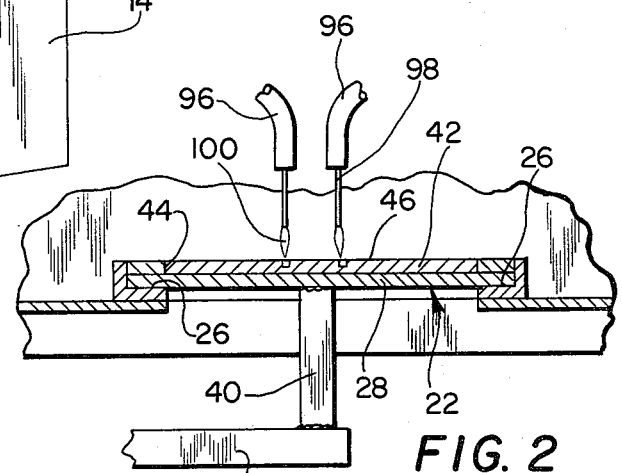
FIG. 2 is a sectional elevational view taken along the line 2—2 of FIG. 1.

Turning now to the drawing and particularly FIG. 1, the apparatus 10 of the present invention is shown as including an overall housing 12 having a front surface 14 from which a horizontally disposed platform or frame 16 outwardly extends. The frame includes a front face 18 and opposite upper side surfaces 20 which cooperatively define a generally centrally disposed opening 22 therebetween. At each inner edge of the side surfaces 20, a guide 24 is provided, which guide includes an inwardly generally L-shaped seat 26. A slide 28 is adapted to rest at opposite edges thereof in such seats 26 and be supported thereby so as to span the central opening 22.

In addition, an assembly 30 for longitudinally moving the slide 28 with respect to the platform or frame 16 is provided. Such assembly includes reciprocal piston 32 movable back and forth in the direction of the arrows shown in FIG. 1 by means of a fluid operated cylinder 34 suitably mounted to the housing 12 by means of supports 36. A cross-bar 38 is suitably attached to the end of the piston 32 by any suitable means such as the threaded nut 40 depicted. The opposite end of the cross-bar 38 is provided with an upstanding arm 40 preferably attached to both the cross-bar 38 and the undersurface of the slide 28 as by welding and the like. In this manner, operation of the cylinder 34 serves to longitudinally move the slide 28 back and forth with respect to the frame 16.

A fixture 42 formed from a heat resistant material such as graphite is adapted to be fixedly positioned on the upper surface of the slide 28. In that regard, one edge of the slide 28 is provided with an upstanding shoulder 44 which serves as a guide for the adjacent edge of the fixture 42 disposed thereagainst for a purpose which will hereinafter be more fully explained. The generally planar face 46 of the fixture is provided with a plurality of longitudinally spaced laterally extending grooves 48 which are configured to receive the particular jewelry article of which portions thereof are to be soldered.

Figure 4:
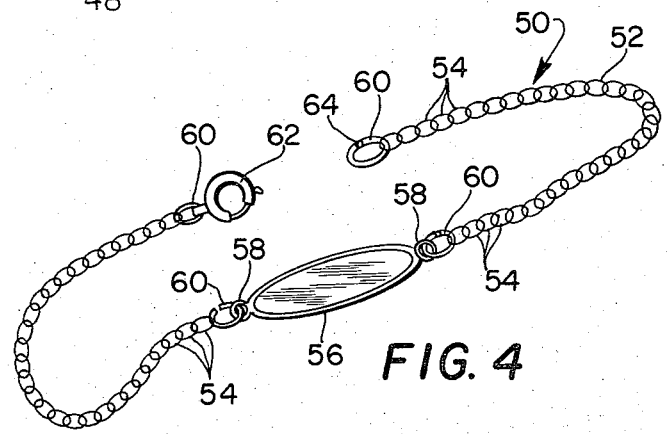
FIG. 4 is a perspective view of one particular type of jewelry article, namely, a chain necklace having an ornamental portion, jump rings and a spring ring in connection with which the connecting jump rings thereof can be automatically soldered utilizing the present invention.

Turning now to FIG. 4 of the drawing, such jewelry article may take the form of a necklace 50 having an elongated body 52 formed from a plurality of chain links 54. Disposed intermediate the body 52 is an ornament 56 provided at each end thereof with a connecting eye 58 which in turn is adapted to be connected with the adjacent link 54 by means of jump rings 60. Similar jump rings 60 are provided at opposite ends of the necklace, one end of which is additionally provided with a spring ring 62 of known construction and through which the necklace may be conventionally opened and closed. The configuration of the jump rings 60 is also conventional, that is, each includes a generally circular split link forming a slight gap 64. This gap 64 receives a charge of silver based solder paste as by an eye dropper. The solder is then elevated to its fusion temperature such that the gap 64 is closed resulting in a hard soldered closed jump ring link. As previously brought out, such operation was, prior to the present invention, normally carried out by hand.

Figure 3:
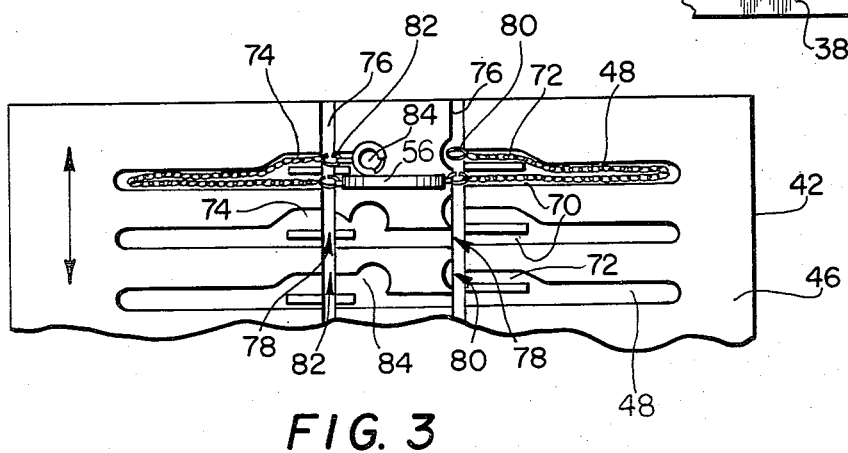
FIG. 3 is a partial plan view on an enlarged scale showing how one of the jewelry articles may be disposed within a heat resistant fixture.

Turning again to FIG. 3 of the drawing, the configuration of the article receiving groove 48 will be more apparent. Thus, each of such grooves 48 includes a main run 70 and opposed secondary runs 72 and 74. The width of the main run 70 is such to accommodate the thickness of the ornameposition within that portion of the main run 70 that is disposed between a pair of longitudinally extending, laterally spaced parallel grooves 76. The longitudinally extending grooves 76 intersect both the main and the secondary runs of the laterally extending article-receiving grooves 48 and are of a dimensional extent so as to accommodate the several jump rings 60 at each mutual groove intersection. Such groove intersections are referred to by the reference numerals 78 when they intersect the main run 70 of the groove 48, by the reference number 80 when the secondary run 72 intersects one of the grooves 76 and by the reference numeral 82 when the secondary run 74 intersects the other of the grooves 76. In addition, the secondary runs 74 may be further provided with a well or recess 84 for receipt of the spring ring 62. It will thus be apparent that the article 50 is disposed within the article-receiving groove 48 in such a manner that the several jump rings 60 thereof are generally fixedly disposed in the groove intersections 78, 80 and 82 and that the jump rings 60 on each side of the necklace 50 are longitudinally aligned with each other.

Turning again to FIG. 1 of the drawing, it will be seen that heating means 86 is provided. Such heating means includes a pair of holders 88 positioned on each side of the frame 16 and disposed on the side surfaces 20 thereof. Such holders 88 include one or more lever arms 90 to which a clamp 92 is attached such that a tube 94 may be disposed therein and held in fixed relation thereto. The tubes 94 include a tube extension 96 from which a very thin needle 98 extends. The needle may preferably be of the surgical hypodermic type and exhibiting a very narrow internal bore (not shown) but having a diameter preferably in a range of between 0.010 and 0.025 inches. The terminal end of the needles 98 are adapted for generally normal positioning above the grooves 76 such that a flame jet 100 emanating therefrom will be directed into such grooves 76. By pinpointing the flame jet 100 into the groove 76 in such a manner, only the jump rings 60 are primarily contacted by the jets such that the adjacent areas of the article body 52 including links 54, the ornament 56 and the spring ring 62 are not heated to an adversely high temperature such that they become annealed or discolored. In this regard it should be brought out that it is the motion of the piston 32 that moves the slide 28 and accordingly the fixture 42 past the jets 100 in timed sequence such that the jump rings are adequately heated to provide for fusion of the solder disposed in the split areas 64 of the jump rings. A suitable fuel for use in the extremely small diameter bore of the surgical needles 98 has been found to be a relatively pure hydrogen gas. Such gas also suitably provides flame temperatures of between 2700° and 3300° F. A suitable rate of travel of the piston is such that each of the jump rings 60 in their respective intersecting groove areas 78, 80 and 82 are contacted by the flame jets approximately one second.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. Automatic soldering apparatus for soldering components of an elongated jewelry article such as the adjacent ends of split jump rings utilized to connect chain to opposite sides of an ornament and to a spring ring wherein it is desirable to avoid adversely thermally contacting those portions of the jewelry article disposed adjacent the ends being soldered comprising, a frame including longitudinally directed laterally spaced guides, a heat resistant fixture disposed between said guides, said fixture adapted for longitudinal movement relative to said frame and having a generally planar upper face in which at least one laterally extending article-receiving groove is disposed for receipt of said jewelry article to a fixed position relative to said fixture, at least one longitudinally oriented groove intersecting said lateral groove, said groove intersection adapted to receive one of said split rings to be soldered, heating means mounted on said frame for directing a narrow, high temperature flame jet into said longitudinal groove and means for longitudinally moving said fixture relative to said frame, whereby said split ring is momentarily contacted by said flame jet during movement of said fixture relative to said jet.

2. The apparatus of claim 1 wherein said jewelry article includes an elongated chain having jump rings at its free extremities, one of said jump rings being connected to a spring ring in turn detachably connected to said other jump ring, said fixture having a second longitudinal groove laterally spaced from the first thereof to form a parallel pair thereof, said one jump ring disposed in one of said grooves and said other jump ring disposed in the other thereof, and said heating means including means for directing a flame jet into each of said pair of longitudinal grooves.

3. The apparatus of claim 2 wherein said jewelry article additionally includes an ornament disposed intermediate said chain and connected thereto at opposite sides by secondary jump rings, said lateral groove being of a looped configuration including a main run and a pair of secondary runs longitudinally spaced from said main run, all of said runs intersecting at least one of said pair of longitudinal grooves such that four such intersections are formed and wherein each of said intersections is adapted to receive a jump ring.

4. The apparatus of claims 1 or 3 wherein there is a plurality of said laterial article-receiving grooves disposed in said fixture in longitudinally spaced relation to each other such that a plurality of articles may be simultaneously held thereby and wherein said movement of said fixture sequentially solders the jump rings or each such article.

5. The apparatus of claim 3, wherein said article body ornament is received in said lateral groove main run between said pair of longitudinally oriented grooves.

6. The apparatus of claim 5, said lateral groove secondary runs terminthe space between said pair of longitudinally oriented grooves and wherein one of said secondary grooves terminates in an enlarged generally planar pocket for receipt of said spring ring.

7. The apparatus of claims 1 or 6 wherein said jump rings are hard soldered by means of the application and heating of a silver based solder paste to the split portion thereof, said flame jets being of an extremely fine diameter and operating in a temperature range of between 2700° and 3300° F.

8. The apparatus of claim 1, said heating means including a surgical type needle having a bore through which an essentially hydrogen fuel is directed, said bore having a diameter of between 0.010 and 0.025 inches so as to produce a pinpoint flame jet.

* * * * *